UNITED STATES PATENT OFFICE.

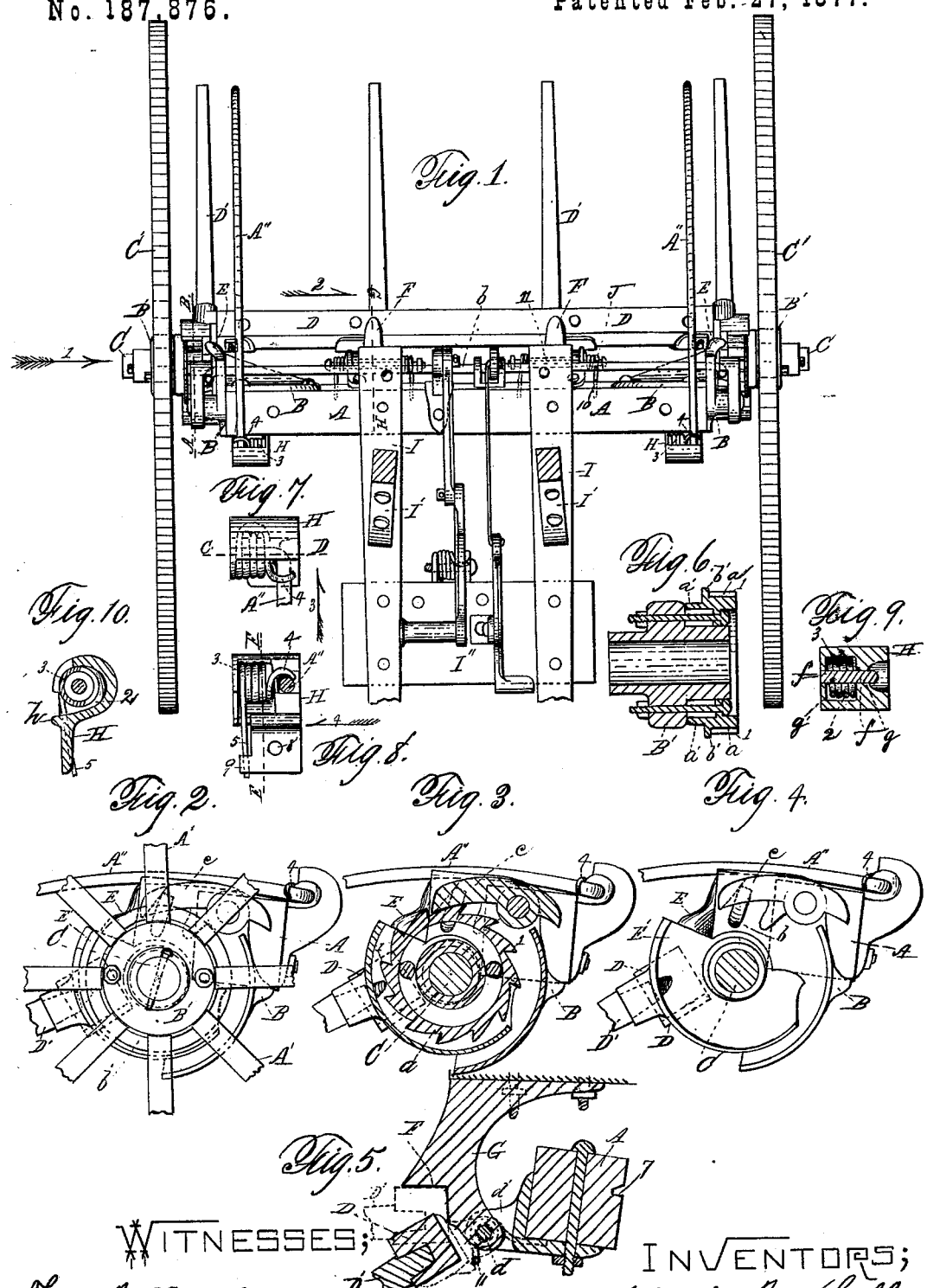

CHARLES M. LUFKIN, OF ALSTEAD, NEW HAMPSHIRE, AND CHARLES G. ALLEN, OF BARRE, MASSACHUSETTS; SAID LUFKIN ASSIGNOR TO SAID ALLEN.

IMPROVEMENT IN HORSE HAY-RAKES.

Specification forming part of Letters Patent No. 187,876, dated February 27, 1877; application filed June 10, 1876.

*To all whom it may concern:*

Be it known that we, CHARLES M. LUFKIN, of Alstead, in the county of Cheshire and State of New Hampshire, and CHARLES G. ALLEN, of Barre, in the county of Worcester and Commonwealth of Massachusetts, have invented certain new and useful Improvements in Horse Hay-Rakes; and we do hereby declare that the following is a true and correct description of the same, reference being had to the accompanying drawings, forming a part of this specification, and in which—

Figure 1 represents a top or plan view (some of the parts being shown in section) of so much of a Lufkin and Allen horse hay-rake, patented August 19, 1873, and July 27, 1875, as is necessary to illustrate our present improvements. Fig. 2 represents an end view of a portion of the rake, (shown in Fig. 1,) looking in the direction of arrow 1. Fig. 3 represents a section on line A B, Fig. 1, looking in the direction of arrow 4. Fig. 4 represents an end view of a portion of Fig. 1, looking in the direction of arrow 1, with the wheel and the parts connected to its hub, removed, and the journal shown in section. Fig. 5 represents a section of a portion of the rake on line G H, Fig. 1. Fig. 6 represents a central longitudinal section through one of the wheel-hubs, and the parts connected thereto, as will be hereafter more fully explained. Fig. 7 represents a top or plan view of one of the rake-teeth holders, and a portion of the upper end of one of the teeth. Fig. 8 represents a front view, looking in the direction of arrow 3, Fig. 7. Fig. 9 represents a section on line C D, Fig. 7, looking in the direction of arrow 3; and Fig. 10 represents a vertical section on line E F, Fig. 8, looking in the direction of arrow 4.

In the drawings, the figures from 2 to 10 inclusive are drawn to an enlarged scale from that shown in Fig. 1, for the purpose of illustrating the construction of the parts more fully.

To enable those skilled in the art to which our invention belongs to make and use the same, we will proceed to describe it more in detail.

As our present improvements are made upon our rake fully shown and described in Letters Patent No. 142,031, dated August 19, 1873, and Letters Patent No. 166,118, dated July 27, 1875, and to which reference is hereby made, it will be unnecessary for us to enter into a detail description of the general construction and operation of the rake, and we shall therefore confine ourselves to a description of our present improvements, which consist, first, in a combination, with the ratchet-wheels and the hubs of the main supporting and driving wheels, of hay and grass guards or shields, as will be hereafter explained; second, in the combination, with the main axle and clearer-supporting bar, of clearer holding and depressing stops, as will be hereafter explained; third, in the combination, with the thill-frame and clearer-supporting bar, of resting-stops, as will be hereafter explained; fourth, in an improved rake-tooth supporting and holding device, as will be hereafter explained; and fifth, in the combination, with the tooth-holder and the upper end of the tooth, of a spiral spring arranged to operate in holding and depressing the tooth, as will be hereafter explained.

In the drawings the part marked A represents the main axle or head of the rake, to the ends of which are secured metallic pieces B, having journals C projecting therefrom, upon which the main supporting and driving wheels C' turn.

To the hubs B', in which the spokes A' of the wheels C' are secured, are fastened the ratchet-wheels a, and which ratchet-wheels, by means of rock-shaft b and pawls c, are caused by the operator to elevate the rake-teeth A'', two of which only are shown in Fig. 1, they being sufficient to illustrate that portion of our invention which relates to the holding and depressing of the rake-teeth.

To prevent grass and hay from working in between the ratchet-wheels a and hubs B', grass or hay guards a' are projected from the outer sides of the ratchet-wheels a, so as to fully close and protect the space between the ratchet-wheels a and hubs B', thereby preventing grass and hay from being caught and wound in between the ratchet-wheels and hubs of wheels C', when the rake is in operation.

To prevent grass and hay from working in over the ratchet-teeth 1, vertical grass and hay guards b' are combined with ratchet-wheels a, as fully indicated in Figs. 2 and 6. If preferred, each ratchet-wheel a and wheel-hub B' may be cast separately, and then secured together by bolts, as indicated in Fig. 6, or they may be cast in one piece. Still again, the grass and hay guards or shields a' and b' may be cast separately from the ratchet-wheels and hubs, and afterward all three of the parts secured together in the relative positions shown in Fig. 6, by means of suitable bolts, screws, or rivets.

Those skilled in the art to which our invention belongs will readily appreciate the practical advantages of this part of our invention.

The bar D, which supports the clearers or fingers D', is hinged to the main axle or rake-head A by ear-pieces, which turn on pivots d in lugs d', fastened to axle A, and to insure the proper depression and holding down of the fingers or clearers D' while the rake is in operation, depressing and holding down stops E are secured to the metal pieces B—one at each end of the rake—so that when the rake-head or axle A, with its teeth, falls back after discharging its load of hay, the stops E E will strike or come in contact with the edges of the metal pieces E', fastened to the ends of the clearer-bar D, and thus the weight of the rake-teeth A'' is brought into use as a means of keeping the clearers or fingers down, thereby preventing the hay from rising up too high between the teeth.

The clearer-bar D being hinged, as before explained, to the rake-head, it has a tendency to rise when the rake-teeth are lifted to discharge the hay, and to prevent a too great upward movement of the fingers or clearers D', a stop, F, is projected back from the rear of each metallic piece G, employed to connect the rear ends of the shafts I I to axle or head A, the shafts I I being connected by a cross foot-board, I''.

It will be understood that the team or horse is attached to and walks between the forwardly-projecting ends of the shafts I I, and, consequently, when the clearer-bar D rises so that it comes in contact with the projections F F it is then stopped, and prevented from rising any farther. This feature of our invention is quite an improvement over our rake patented July 27, 1875, since in that rake the clearer-bar D and its fingers D' did not have the hinge movement above described.

The form and relative position of the ear-pieces, by which clearer-bar D is hinged to the main axle or head A, are indicated by dotted lines in Fig. 5.

The part marked H represents the tooth-holding piece, and which piece is formed with a recess or socket, 2, in which a spiral spring, 3, is arranged around the bent end f of the rake-tooth, which passes through supporting-flanges g g' in the tooth-holding piece H. One end, 4, of spiral spring 3 is bent into hook form, and is hooked upon the rake-tooth, while the other end, 5, of the coiled or spiral spring is allowed to rest against the front side of axle or head A when the rake is in use.

It will thus be seen that when the lower ends of the rake-teeth A'' are raised by pressure occasioned by the hay, or by coming in contact with any slight obstruction, the coiled or spiral spring 3 will be contracted in its socket 2, and that the teeth will be held down by a yielding pressure in consequence of the combination of spiral or coiled springs 3 with the teeth and their holders, as above described; and, further, that the coiled or spiral springs 3 are not liable to become cramped or bound, since they are held by their sockets, so that there are open spaces between their inner surfaces and the bent ends f of the rake-teeth. This feature of our invention is a great improvement over the use of springs, which are fitted upon tubular or other projections filling, or nearly so, the spaces within such coiled springs.

The rake-head is made with a longitudinal slot or groove, 7, into which the projections h of the teeth-holders H are fitted; consequently the teeth-holders H can be held securely in position by a single bolt passing through the hole 8 in the holder H.

In shipping the rakes, it is often desirable to take them apart, with the wheels, teeth, and other parts packed separately, and to prevent the springs from flying out of the teeth-holders projections 9 are formed on the holders, so that the ends 5 of the springs 3 can be sprung back behind said projections, as shown in dotted lines, Figs. 8 and 10, thereby locking the springs in position and holding the rake-teeth and their respective holders together, even though they may be detached from the axle or head A.

To keep the clearers or fingers D' from dropping down, spiral springs J are combined with the pivots d, so that their ends 10 will bear underneath the axle A, while their loops 11 will bear up against the ears which connect the clearer-bar D to axle A.

It will be understood that spiral springs J are formed with the loop 11 between their coiled ends, which rest upon and are supported by pivot-rod d upon each side of the ear-piece, which connects the clearer-bar D to the ear-piece d' of the axle or rake-head, as indicated in full and dotted lines, Figs. 1 and 5 of the drawings.

Having described our improvements in horse hay-rakes, what we claim therein as new and of our invention, and desire to secure by Letters Patent, is—

1. The combination, with the ratchet-wheels a and hubs B' of wheels C', of hay guards or shields a' and b', substantially as and for the purposes set forth.

2. The combination, with the main axle or rake-head A and clearer-supporting bar D, of holding and depressing stops E E, substantially as and for the purposes set forth.

3. The combination, with the connections G G and hinged clearer-bar D, of resting-stops F, substantially as and for the purposes set forth.

4. The tooth holding and supporting device H, constructed to receive and hold the rake-tooth, substantially as and for the purposes set forth.

5. The combination, with the socket-holding part 2 of the tooth-holding device H and the bent end $f$ of the rake-tooth A″, of the spiral spring 3, substantially as and for the purposes set forth.

6. The combination, with the projecting end 5 of coiled spring 3, of the projections 9 of the tooth-holder H, substantially as and for the purposes set forth.

CHARLES M. LUFKIN.
CHAS. G. ALLEN.

Witnesses:
TIMOTHY DRISLORNE,
AIKEN GILMORE.